US008115176B2

(12) United States Patent
Stein et al.

(10) Patent No.: US 8,115,176 B2
(45) Date of Patent: Feb. 14, 2012

(54) DETECTOR FOR THE MEASUREMENT OF IONIZING RADIATION

(75) Inventors: Jürgen Stein, Wuppertal (DE); Guntram Pausch, Dresden (DE)

(73) Assignee: ICx Radiation GmbH, Solingen (DE)

( * ) Notice: Subject to any disclaimer, the term of this patent is extended or adjusted under 35 U.S.C. 154(b) by 316 days.

(21) Appl. No.: 11/908,787

(22) PCT Filed: Jul. 22, 2005

(86) PCT No.: PCT/EP2005/053577
§ 371 (c)(1),
(2), (4) Date: Dec. 28, 2009

(87) PCT Pub. No.: WO2007/009495
PCT Pub. Date: Jan. 25, 2007

(65) Prior Publication Data
US 2011/0101232 A1    May 5, 2011

(51) Int. Cl.
*G01T 1/40* (2006.01)
(52) U.S. Cl. .................................. 250/370.11
(58) Field of Classification Search ............... 250/252.1, 250/370.11
See application file for complete search history.

(56) References Cited

U.S. PATENT DOCUMENTS

| | | | | | |
|---|---|---|---|---|---|
| 3,767,850 | A | * | 10/1973 | McMillian et al. | 358/474 |
| 4,047,034 | A | * | 9/1977 | Auphan | 250/354.1 |
| 4,272,677 | A | * | 6/1981 | Berthold et al. | 250/252.1 |
| 5,157,250 | A | * | 10/1992 | Oikari et al. | 250/207 |
| 5,260,566 | A | * | 11/1993 | Reed | 250/227.16 |
| 5,313,065 | A | * | 5/1994 | Reed | 250/368 |
| 6,087,656 | A | * | 7/2000 | Kimmich et al. | 250/252.1 |
| 6,333,502 | B1 | * | 12/2001 | Sumita et al. | 250/366 |
| 2005/0269513 | A1 | * | 12/2005 | Ianakiev et al. | 250/362 |

FOREIGN PATENT DOCUMENTS

| | | | | |
|---|---|---|---|---|
| FR | 2525027 | A | * | 10/1983 |
| JP | 06138240 | A | * | 5/1994 |
| JP | 06258446 | A | | 9/1994 |
| SU | 943622 | A1 | | 7/1982 |

OTHER PUBLICATIONS

Johann Peter Peiffer, The Calibration System for the Outer Detector of the Borexino Experiment, Diploma Thesis, 2003, Abstract, Ruprecht-Karls-Universitat, Heidelberg, Germany.

* cited by examiner

*Primary Examiner* — David Porta
*Assistant Examiner* — Marcus Taningco
(74) *Attorney, Agent, or Firm* — IP Strategies

(57) ABSTRACT

The invention relates to a detector for the measurement of ionizing radiation, preferably γ-radiation and x-rays, comprising a scintillator and a light detector, the light detector being stabilized by using a predefined light source, preferably a Light Emitting Diode (LED), where the length and/or shape of the light pulses of the light source is different from the length and/or shape of the light pulses emitted by the scintillator. The light source induced pulses and the radiation induced pulses are separated from all other pulses on the basis of their pulse width. The detector is additionally stabilized by correcting the measured light output, that is the pulse height of the output signals, of the detector with the detector temperature shift, being dependant from the average pulse width of the accumulated γ-pulses.

33 Claims, 4 Drawing Sheets

DETECTOR FOR THE MEASUREMENT OF IONIZING RADIATION

BACKGROUND OF THE INVENTION

This invention relates to a detector for the measurement of ionizing radiation, preferably γ-radiation and x-rays, comprising a scintillator, emitting light when radiation is partly absorbed, and a light detector, preferably a photo cathode with a photo multiplier optically coupled thereto, the light detector being stabilized by a predefined light source, preferably a light emitting diode (LED), where the length and/or shape of the light pulses of the light source are different from the length and/or shape of the light pulses, emitted by the scintillator, following the absorption of radiation, and an electronic system, stabilizing the whole detector.

In order to increase the measurement accuracy of radiation detectors, it is necessary to either correct the measured data after the measurement has been completed or to stabilize the detector during the actual measurement. Especially in handheld radio isotope identification devices (RID) and radiation portal monitors (RPM), which are applied for homeland security purposes, it is an advantage to stabilize the detector during the measurement, as this allows a fast and accurate evaluation of the data by people with no education in nuclear physics. RIDs, for example, are mainly used by police or customs, where neither an equipment for the correction of the data after completion of the measurement is available, nor people with a necessary education. In addition and may be most important, measurements in those surroundings have to provide a quick and accurate result.

RIDs, applied for homeland security, are mostly based on γ-spectrometers with scintillation detectors. Such systems must tolerate a wide range of operational conditions, particularly of ambient temperature, detector count rate, and γ-energies of the radiation field. Efficient detector stabilization therefore is essential to maintain energy calibration and resolution if strong and rapid changes of the ambient condition are occurring.

In the prior art, it is known to stabilize a light detector by bringing the light of an LED to the light detector and separating the resulting signals from the signals, induced by nuclear radiation. The shift of the light induced pulses in the light detector then is a measure for the temperature drift of the light detector to be corrected. It is also known to stabilize a scintillator by analyzing the pulse shape of the scintillation output signals.

With the techniques known in the prior art, it is possible to stabilize a radiation detector, namely a RID, to a shift of larger than 2% when the ambient conditions change as described above.

BRIEF SUMMARY OF THE INVENTION

It is a purpose of the present invention to improve those systems so that a stabilization of a scintillation detector is better than 2%, preferably better than 1%. It is another purpose of this invention to provide a detector, preferably of hand-held type, where it is possible to conduct the stabilization during the actual measurement. It is also an object of this invention to provide a detector, where the stabilization parameters can be set in the light of the actual ambient conditions.

According to the invention, a detector for the measurement of ionizing radiation, preferably γ-radiation and x-rays, is provided, comprising a scintillator, emitting light when radiation is at least partly absorbed, and a light detector, preferably a photocathode with a photomultiplier optically coupled thereto, the light detector being stabilized by using a predefined light source, preferably a Light Emitting Diode (LED), where the length and/or shape of the light pulses of the light source is different from the length and/or shape of the light pulses, emitted by the scintillator, following the absorption of radiation, and an electronic system, stabilizing the whole detector. Such a detector is stabilized using the following method steps: digitizing the detector output signals, extracting the energy, i.e. the pulse height, and the pulse width for each single signal, separating the light source induced pulses from all other pulses on the basis of their pulse width, accumulating the light source induced signals, stabilizing the light detector by correcting its gain shift, using the shift of accumulated light source induced pulses, separating the radiation induced pulses from all other pulses on the basis of their pulse width, stabilizing the radiation induced pulses by applying the stabilization of the light detector, obtained from light source induced pulses, accumulating the radiation induced signals, obtaining the temperature of the detector at the time of measurement, using the pulse width of accumulated radiation induced pulses, and stabilizing the detector by additionally correcting the measured light output, that is the pulse height of the output signals, of the detector with the detector temperature shift, being dependent from the average pulse width of the accumulated γ-pulses.

In a preferred embodiment, the light source induced pulses are accumulated for a predefined period of time, preferably between 1 s and 60 s, especially preferred for between 2 s to 10 s and even more preferred for about 5 s. The accumulated pulses are used to determine the stabilization parameters of the light detector for at least one predefined period of time, following the determination of the stabilization parameters. At the same time light source induced pulses are accumulated for a predefined period of time. It has proven a specific advantage when the determination of the stabilization parameters of the light detector is processed at least partly in parallel to the accumulation of the new light source induced pulses and it is even more advantageous when said parallel processing is done with additional processing means, preferably a coprocessor, allowing for parallel filtering, processing and accumulation without consuming substantial additional time.

In another preferred embodiment, the radiation induced pulses are accumulated for a predefined period of time, preferably between 1 s and 60 s, especially preferred for between 2 s to 10 s and even more preferred for about 5 s. Those accumulated pulses are used to determine the stabilization parameters of the scintillator for at least one predefined period of time, following the determination of the stabilization parameters. The new radiation induced pulses are accumulated for a predefined period of time also. Said determination of the stabilization parameters of the scintillator is preferably processed at least partly in parallel to the accumulation of the new radiation induced pulses, whereas it is even more preferred when this is done using additional processing means, preferably a coprocessor, allowing for parallel filtering, processing and accumulation without consuming substantial additional time.

A further embodiment is part of this invention, where the set pulse width range of the radiation induced pulses, used to separate the radiation induced pulses to be measured from other pulses, is set dynamically during the measurement on the basis of measured parameters in the detector. The set pulse width range is preferably determined dynamically from at least one of the parameters, counting rate, temperature of the detector, energy spectrum of pile up signals, count rate of pile up signals, energy spectrum of noise signals, or count rate of noise signals.

Due to another embodiment, the trigger level of the detector, below which the measured pulses are deleted, is set dynamically during the measurement on the basis of one or more of the measured parameters counting rate, energy spectrum of pile up signals, count rate of pile up signals, energy spectrum of noise signals, or count rate of noise signals.

It is an advantage if the detector according to the invention provides that the set pulse width range of the light source induced pulses, used to correct the gain shift of the light detector, is set dynamically during the measurement on the basis of measured parameters, preferably on the basis of the measured temperature of the LED.

A further advantage is achieved when the light source of the detector is mounted at a position within the detector so that the light being emitted from the scintillator and the light being emitted from the light source couple to the light detector at mainly different places. Preferably, this position allows the light emitted from the light source to travel at least in part through the inner part of the photomultiplier, including through the glass walls of the photomultiplier, to the photocathode. Specific advantages can be achieved when the light source is mounted in the rear part of the detector, allowing for better maintenance of the light source.

BRIEF DESCRIPTION OF THE DRAWINGS

A specific embodiment of the invention is described on the basis of the following figures.

DETAILED DESCRIPTION OF THE INVENTION

Figure 1:
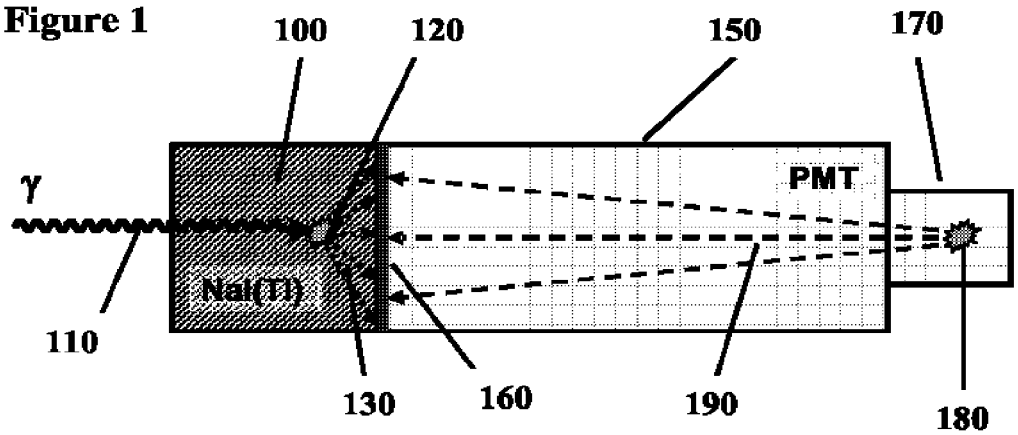
FIG. 1 shows an overall sketch of an RID, comprising a scintillator crystal, a photo multiplier tube and an LED, FIGS. 2a and b show typical output signals for LED triggered and radiation triggered pulses.

In FIG. 1, the main elements of an RID (without electronics) can be seen, that is a NaI(Tl) scintillation crystal 100, a photomultiplier 150 with a photocathode 160 attached thereto, serving as a light detector, as well as a socket 170, wherein an LED 180 is mounted.

The γ-radiation 110 is entering the scintillation crystal 100 and is absorbed within this scintillation crystal. An excited state 120, following the absorption from the nuclear radiation, decays under the emission of light 130. The light 130 is then directed to the photocathode 160, which, as a consequence of the light absorption, is emitting electrons. The resulting electric signal is amplified within the photomultiplier 150 and then forwarded to the detector electronics.

At the same time, an LED 180 is mounted in the socket 170 of the photomultiplier 150. The LED emits light 190, which is passing the photomultiplier 150, finally being absorbed by the photo cathode 160.

The mounting of the LED in the socket of the photomultiplier, that is at the same time in the socket of the complete detector, has the big advantage that the light of the LED is directed to the photo cathode 160 without having to pass the scintillator 100. Therefore problems are avoided, which arise from the usual coupling of the light of the LED 180 to the scintillator 100. At the same time, the mounting of the LED in the socket of the detector allows for a very simple maintenance of the LED, as the LED 180 can be detached together with the socket 170. Therefore the LED can be changed without having to open the complete detector, just having to remove the socket.

Figure 2A:
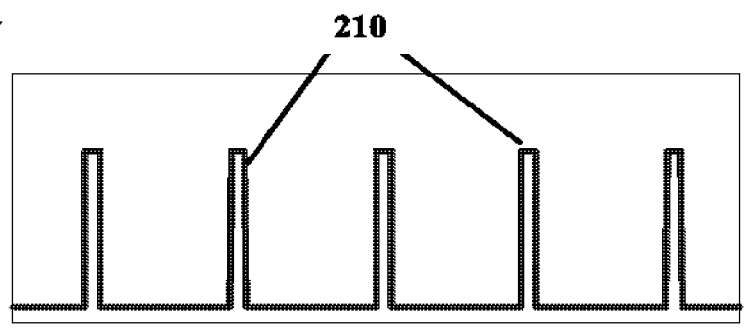
Figure 2B:
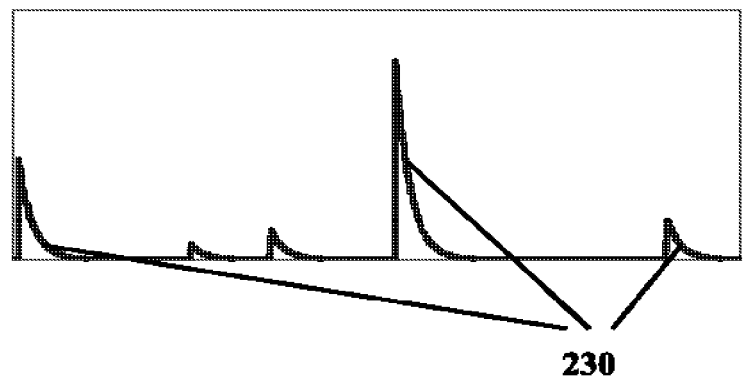

The electronic photomultiplier output signals (current signals) are shown in FIGS. 2a and 2b. FIG. 2a shows LED induced output signals 210, following the absorption of the light 190, emitted from the LED 180, by the photo cathode 160. As the LED 180 preferably is operated in a pulsed mode, the signals are very regular and do have a mainly rectangular shape. This rectangular shape of the LED signals 210 follows from the fact that the LED can be switched on and off very quickly.

FIG. 2b shows the signals, following the absorption of γ-signals 110 within the scintillator 100. Those signals do occur statistically, that is with substantial irregularities. In addition the signal height is varying and, finally, signals 230 do show an exponential, not a linear decay. This exponential decay follows from the exponential decay of the excited states within the scintillation crystal 100.

In order to stabilize the detector according to this invention, the γ-induced signals and the LED induced signals have to be separated from each other. In addition, temperature effects, resulting from the variations of the temperature of the scintillation crystal have to be excluded.

In order to do so, the measured signals are digitized in a first step. Such a digitalization allows not only an evaluation of the pulse height, being a measure for the energy of the absorbed radiation, but also of the width and of other pulse shape parameters of the measured signal. Therefore, a digital signal analysis has substantive advantages when compared to an evaluation with standard analog electronics.

Figure 3:
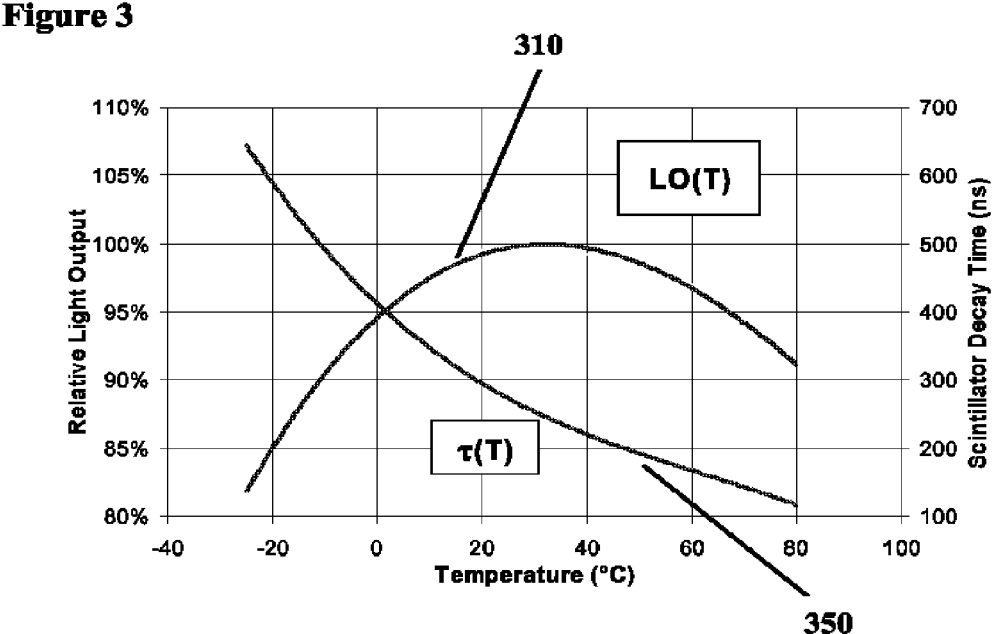
FIG. 3 shows typical properties of an NaI(Tl) scintillation crystal, FIGS. 4a and b show the influence of the signal form to digitally filtered output signals.

FIG. 3 shows the measured light output LO(T) and the measured scintillator decay time τ(T) of a NaI(Tl) scintillation crystal as a function of its temperature.

Line 310 schematically shows the measured relative light output LO(T) of the scintillator as a function of its temperature T. It can be seen that the light output is increasing between −30° C. to +30° C., whereas the light output is again decreasing when the temperature increases further. The scale on the left side of FIG. 3 shows the relative light output in percent. It can be seen that the variations of the measured relative light output LO(T) sum up to about 15%. Such a variation is not tolerable for standard RIDS.

Line 350 schematically shows the measured scintillator decay time τ(T) in nanoseconds (ns) as a function of the temperature T. The scale for the scintillator decay time in ns can be seen at the right side of FIG. 3. From this measurement, it follows that the scintillator decay time τ(T) decreases with increasing temperature T, covering a wide range of about 650 ns to 150 ns within the temperature range of relevance.

The inventive detector makes use of this variation in scintillator decay time, as τ(T) is a monotonous function within the temperature range of interest, therefore providing a reproducible functional relationship between temperature and decay time.

Figure 4A:
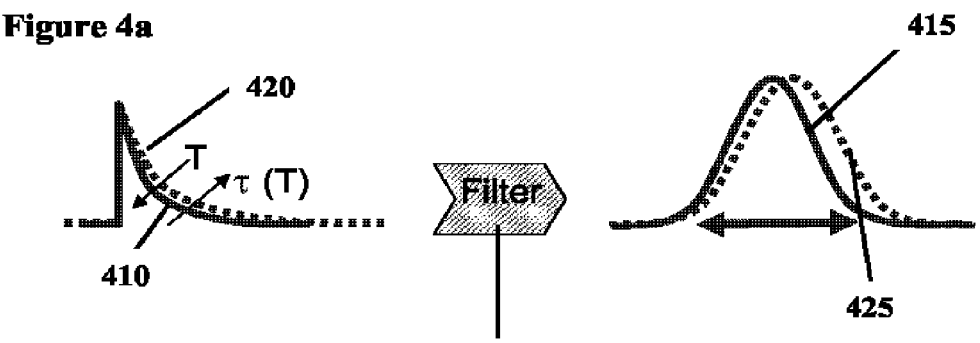
Figure 4B:
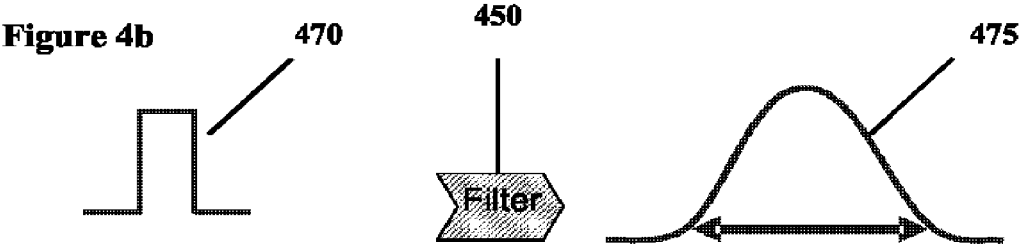

FIGS. 4a and 4b show the effects to various input signals.

FIG. 4a shows at the left side a radiation induced signal 410 with the typical steep rising flank, immediately followed by the exponential decaying flank The dashed line 420 shows another γ-induced signal, whereas this second signal 420 has a longer decay time, meaning that the temperature of the scintillation crystal was lower at the time of measurement.

After applying a filter 450, output signals 415 and 425 are the result. It can be seen that the initial signal 420 with the longer decay time results in a higher pulse width compared with the initial signal 410.

It has to be mentioned that, within the here discussed embodiment, the actual pulse width is measured and taken as a parameter. Nevertheless, other pulse shape parameters, for example the rise time of the signal, may be used instead or even in combination. Therefore it has to be understood that in the framework of this invention, pulse width stands for any pulse shape parameter, being influenced by the scintillator temperature.

It has to be mentioned, that it does not matter for the present invention if the photomultiplier output signals are digitized first, so that the filter 450 is a digital filter, or if the photomultiplier output signals are sent through an analog filter 450, being digitally sampled only after having passed such a filter. The effects schematically shown in FIGS. 4a and 4b are the same.

FIG. 4b shows the same for LED induced signals 470. The shown LED signal 470 is, compared to the γ-signal, fairly broad, resulting in a very broad monopolar output signal 475 after the filter 450 has been applied.

As the digital signal processing allows an analysis of both, the pulse height and the pulse shape, it is possible to first separate the LED induced pulses 475 from the radiation induced pulses 415 and 425.

In order to do so, the pulse width and the pulse height of the LED signals 470 have to be defined by the settings of the LED pulse generator so that the pulse width of the resulting filtered signal 475 is outside the range of the radiation induced signals 415 and 425 in a pulse width spectrum. The separation of the LED induced signals from the radiation induced signals is then just based on a pulse width analysis, namely by setting a window on the pulse width of the LED in the resulting spectrum.

At the same time, the pulse width of the remaining signals allows the determination of the temperature of the scintillation crystal. Once the temperature or at least a temperature related parameter of the scintillation crystal is known, the detector can be stabilized by correcting for scintillation temperature induced effects.

Figure 5:
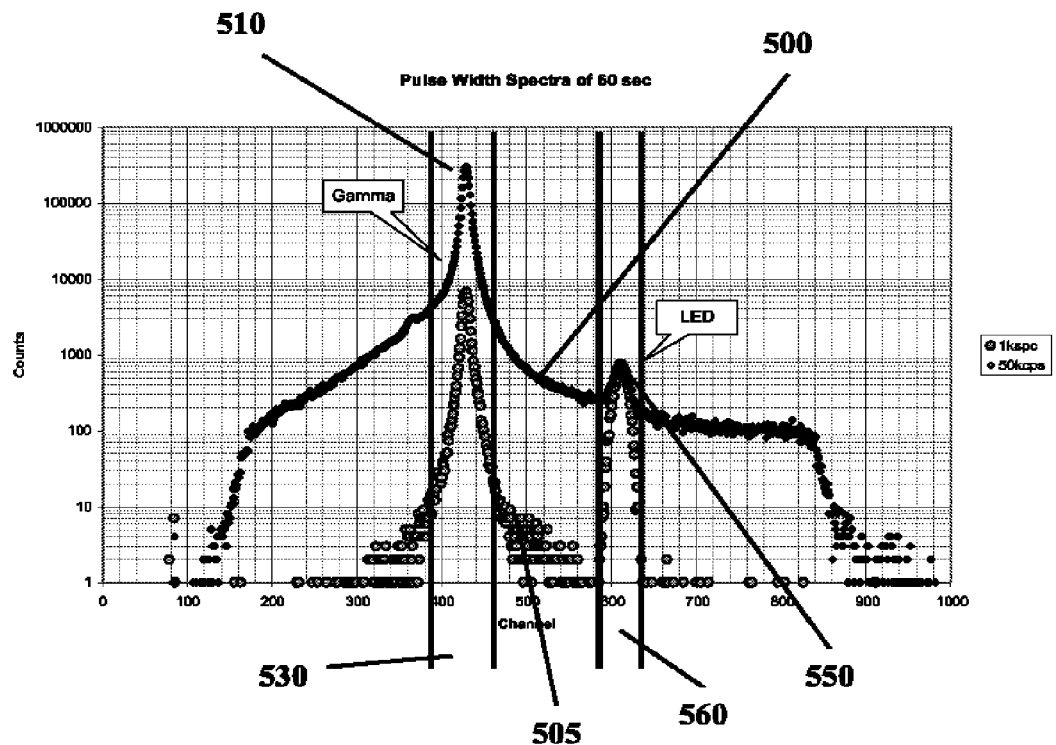
FIG. 5 shows a measured pulse-width spectrum.

FIG. 5 shows two measured pulse width spectra 500 and 505. Shown is the counting rate against the measured pulse width of the signal. The two spectra show results for a high counting rate (spectrum 500) and a much lower counting rate (spectrum 505).

The radiation induced pulses 510 can be clearly distinguished from the light induced pulses 550. Therefore, an extraction of pulses, lying within a window 530, does lead to an extraction of the radiation induced pulses whereas the limitation to another window 560 does lead to an extraction of the LED induced pulses.

Figure 6:
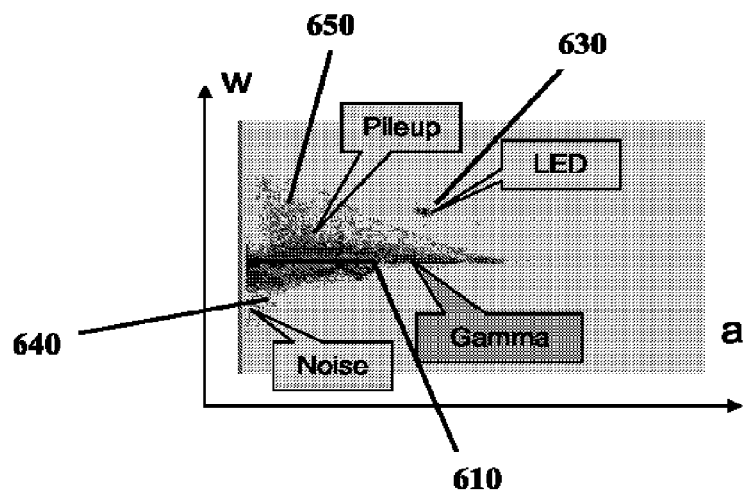
FIG. 6 shows a two-dimensional spectrum with the parameters pulsewidth and energy.

In FIG. 6, a two-dimensional spectrum can be seen. More specifically, the amplitude a of the measured signals is representing the x-axis, the pulse width w of the signals is presented along the y-axis. The z-axis is represented by the concentration of the dots within the spectrum, whereby every dot stands for a measurement value and the grey scale where many dots are overlapping.

The deep dark line 610 in the centre of the spectrum stands for the radiation induced pulses. Clearly separated therefrom are the LED induced pulses 630, more or less forming a spot within the spectrum.

As the amplitude a of the LED induced pulses is a function of the used light intensity and the width w of the LED induced pulses is a function of the pulse length of the LED pulses, it becomes clear that the position of the LED spot 630 in that spectrum can be chosen almost freely. It is, therefore, possible to adjust the LED stabilization of every single detector to its specific purpose—high or low radiation, radiation with high or low energy, high or low counting rates—by modifying the LED pulse parameters. Therefore, it can be achieved that the LED signals are outside of the spectrum of most of the measured signals so that the stabilization of the light detector with the LED pulses is not disturbed by the measurement pulses at all.

The area 650 above the radiation induced pulses 610 is representing pulses having a larger pulse width. Those pulses are mainly the result of pileup effects. A pileup occurs when a second radiation induced pulse starts before the first radiation induced pulse has been decayed completely. Pileup effects are a serious problems in high radiation fields.

Below the central γ-line 610, another area is visible, which consists of noise pulses 640.

From this FIG. 6 it can be seen that the signal processing within the described detector not only allows for a stabilization of the detector, thus eliminating temperature effects, but also for a very efficient suppression of pile-up and noise effects.

The actual stabilization of the detector is described in the following. First of all, radiation induced pulses are measured, leading to an output signal which is filtered as described above. At the same time, a pulsed LED is used in such a way that pulse width of the light induced signals, measured by the light detector, is sufficiently different from the pulse width of the radiation induced signals. In addition, it is an advantage when the "energy" of the LED induced signals, that is their pulse height, has a sufficient difference to the "energy"—pulse height—of the pile-up and noise signals, shown in the two-dimensional spectrum of FIG. 6.

Only signals with a pulse height above a predetermined trigger threshold are processed. This threshold is set in order to suppress very small signals, usually just resulting from noise. This trigger threshold defines the lowest energy to be measured with the detector.

After having passed the trigger threshold the signals are further evaluated by (digitally) determining their pulse width and their amplitude. At the same time the pulse width spectrum P is incremented by each pulse.

Then, the signal is classified. If the pulse width of the signal to be evaluated lies within the window, being set for radiation induced pulses, the signal is assumed to have its origin in the light emission, following an absorbed radiation pulse. In case the pulse width and eventually the amplitude of the signal fall into the window, being set for LED pulses, this signal is classified as an LED induced signal. Finally, if the signal to be evaluated is outside both, the radiation induced and the LED induced window, it is classified as trash and deleted.

Optionally, noise and/or pileup events can be classified by separate windows, and used for a dynamic adjustment of system parameters like the trigger threshold or the width of the pulse width window for identification of gamma events.

In addition, the width of the window set in order to extract the radiation induced pulses can be set dynamically also, for example as a function of the measured counting rate. When a high counting rate is seen with the detector, the width may be narrowed, as still enough pulses for a quick evaluation are available. This narrowing allows an additional improvement of the measured signals and especially an improvement of the pile-up suppression, thus allowing the use of the detector in high radiation fields, where it has to cope with higher counting rates.

As a result, at least the energy spectrum and the LED spectrum (optionally the noise and/or pileup spectra as well) are incremented by the respective signals, whereas other signals are deleted again before the next signal is evaluated.

The pulse width spectrum resulting from the addition of all pulses and the LED spectrum resulting from the addition of the LED induced pulses, optionally the spectra resulting from the noise or the pile up pulses, are summed up for a predetermined time. This predetermined time can be set in the light of the specific measurement to be conducted. Fast temperature changes require a fairly short time, whereas a very constant environment allows for longer time periods. At the same time, a high counting rate allows for short time intervals, very low counting rate needs more time. Experiments have shown that a predetermined time between one second and one minute is sufficient for most purposes, a predetermined time of 5 seconds leads to the best compromise between sufficient statistics and high accuracy. It is even possible to allow for a manual or automatic modification of this predetermined time. For example, this time could be set on the basis of the actually measured counting rate.

After the predetermined period of time has passed the accumulated spectra for both LED and radiation induced pulses, optionally the spectra resulting from the noise or the pile up pulses, are evaluated.

The position of the LED peak in the LED spectrum is set into relation with a predetermined peak position for this specific detector. The result of this comparison between the measured position of the LED peak with the predetermined peak position is an LED stabilization factor, allowing for the stabilization of the light detector.

At the same time, the peak position of the radiation induced pulses in the pulse width spectrum is evaluated. This position is a measure of the detector temperature. A predetermined stabilization function, e.g. a polynomial or a lookup table with the said peak position as a parameter, stored within the detector, allows for a stabilization of the detector with regard to the temperature of the scintillation crystal and other temperature effects.

Both, the LED calibration factor as well as the temperature calibration factor are applied to the amplitude of the measured radiation induced signals so that the measured energy spectrum is stabilized as a result. In order to further increase the long term stabilization, it is possible to stabilize the energy spectrum with an additional long term stabilization factor. This long term stabilization factor can compensate for the aging process of the LED or the electronics or other long term effects, which can be seen in a detector.

As the signals are digitized, it is possible to determine the stabilization factors for the elapsed time period in parallel to the measurement of the signals for the next time period. As soon as a new set of stabilization factors has been established, the old stabilization factors are replaced by the new stabilization factors. As a result, it is possible to dynamically stabilize the complete detector, using very short time intervals for determining the stabilization factors. This leads to a very high accuracy of the stabilization even if fast and substantial temperature changes do occur, which can be seen from FIG. 7.

Figure 7:
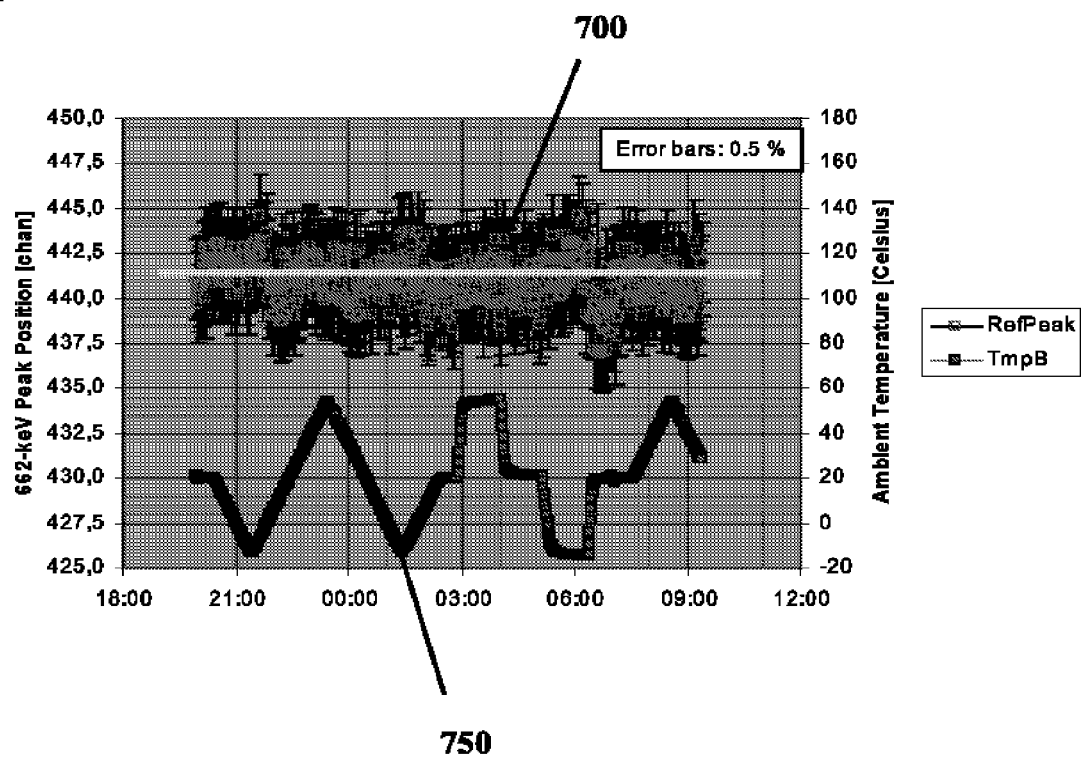
FIG. 7 shows the stabilization when applying a $\Delta T$ of 80 K.

In the upper part of FIG. 7, the measured peak positions 700 of the 662 keV calibration pulse is shown. During the measurement the temperature T has been modified in a wide range, namely between −20° C. and +60° C. The temperature modification is shown as a function 750 of the elapsed time in the lower part of the picture. The position of the γ-peak is given in relative (channel) values, the scale of which can be found on the left side of the spectrum. On the right side of the spectrum, the temperature in ° C. is shown, relating to the temperature scale in the lower part of the spectrum.

The results of the measurements show that the stabilization of the detector allows for an accuracy of about 1%, even when very fast temperature changes occur. This accuracy in the stabilization of the detector of about 1% is more than twice as good as the stabilization of any detector known from the prior art.

As the present detector allows for a stabilization of the photomultiplier on the basis of a completely separate LED spectrum, the resulting y-spectrum is completely free of any calibration/stabilization pulses. This allows for a higher sensitivity compared to standard detectors, which have to be stabilized using a (weak) γ-radiation source, being necessarily part of the spectrum to be evaluated. Different from standard RID detectors available from the prior art, it is at the same time not necessary to use a radioactive calibration source.

Additional advantages of the detector according to this invention, especially to the detector described above, is the excellent pileup suppression even at high counting rates with an extremely accurate suppression of a noise at the same time. Those suppressions allow the use of a lower energy threshold, namely of 15 keV instead of 25 keV in prior art detectors.

As this detector allows a very efficient pile-up suppression, the detector tolerates extremely high counting rates with at the same time providing an excellent energy resolution. This is not only a consequence of the fast digital signal processing, but also of the improved pile-up suppression and the exclusion of effects, resulting from variations in the amplification because of varying counting rates.

The ability to properly deal with high counting rates allows in addition very short measurement cycles in high radiation fields for nuclide identification, thus reducing the radiation exposure of the operator. Because of the excellent stability, the improved ability to cope with high counting rates and the at the same time lower threshold, both very weak and very strong radiation sources can be identified with the same detector.

When counting the LED reference signals, the number of which is known from the pulsing information, it is even possible to come to very exact and precise dead time correction information which may be used for a quantitative analysis in all radiation fields.

As the stabilization of the detector needs only the radiation signals to be measured anyway and signals from the LED, it is not necessary to use a radioactive (internal or external) source in order to calibrate the detector in the beginning. This allows a very fast start of the measurement, as the time for the initial calibration is saved. As this internal stabilization, using the LED and the radioactive induced signals only, may be operated in very strong radiation fields also, such a very fast start up of the detector can be very important, especially in emergency situations.

At the same time, the administrative problems in connection with such a RID are very much limited, as no radioactive calibration source is implemented. Therefore it is not necessary to obtain specific allowances for the transport of the detector. In addition, the production and removal of radioactive material can be avoided, as no radioactive sources are necessary for the stabilization of this detector. This has positive effects to the environment also.

As the very good sensitivity of the described detector allows the finding and the identification of very weak radiation sources, i.e. environmental radioactivity, and as at the same time the device, which can be used very save and simple by non-experts also, can be manufactured in a very robust way, it allows mobile measurements for environmental purposes in the field, thus avoiding complicated lab analysis after picking up probes. It for example also allows the evaluation of food without complicated and time consuming lab analysis. Finally, the new detector can be used in schools and universities very easily, as the problems related to radio active calibration sources are avoided.

The invention claimed is:

1. Method of stabilizing a detector adapted to measure ionizing radiation and produce corresponding output signals, wherein the detector comprises
    a scintillator adapted to emit light pulses when radiation is at least partly absorbed, and
    a light detector,
    a predefined light source adapted to generate light pulses having a width and/or a shape different than a width and/or a shape of the light pulses emitted by the scintillator following the absorption of radiation, and
    an electronic system adapted to stabilize the detector,
    the method comprising:
        digitizing the detector output signals,
        extracting a pulse height and the pulse width for each individual detector output signal,
        separating the light source-generated light pulses from all other light pulses on the basis of pulse width,
        accumulating the light source-generated light pulses for a predetermined time,
        correcting a gain shift according to a gain shift of the accumulated light source-generated light pulses,
        separating the scintillator-generated light pukes from all other light pulses on the basis of pulse width,
        stabilizing the scintillator-generated light pulses by applying the gain shift correction of the light detector,
        accumulating, the scintillator-generated light pulses for a predetermined time,
        determining a temperature of the detector at the time of a measurement, using the pulse width of the accumulated scintillator-generated light pulses, and
        correcting the pulse heights of the detector output signals based on the detected temperature, being dependent from an average pulse width of accumulated scintillator-generated light pulses,
    wherein the gain shift and temperature for a stabilization time period are determined in parallel to the generation of output signals for the immediately subsequent time period,
    further comprising dynamically setting a pulse width range of the scintillator-generated light pulses during the generation of output signals on the basis of measured parameters.

2. Method according to claim 1, wherein a predetermined period of time for accumulating the light source-generated light pulses is between 1 s and 60 s, and wherein the accumulated light source-generated light pulses are used to determine the stabilization parameters of the light detector for at least one predefined period of time, following the determination of the stabilization parameters, and wherein new light source-generated light pulses are accumulated for a predefined period of time.

3. Method according to claim 2, wherein the electronic system includes processing means, the method further comprising parallel filtering, processing and accumulation without consuming substantial additional time.

4. Method according to claim 1, wherein a predetermined period of time for accumulating the scintillator-generated light pulses is between 1 s and 60 s, and wherein the accumulated scintillator-generated light pulses are used to determine the stabilization parameters of the scintillator for at least one predefined period of time, following the determination of the stabilization parameters, and wherein new scintiliator-generated light pulses are accumulated for a predefined period of time.

5. Method according to claim 4, wherein the electronic system includes processing means, the method further comprising parallel filtering, processing and accumulation without consuming substantial additional time.

6. Method according to claim 1, where the set pulse width range is determined dynamically based on at least one of the following parameters:
    counting rate,
    temperature of the detector,
    energy spectrum of pile up signals,
    count rate of pile up signals,
    energy spectrum of noise signals, and
    count rate of noise signals.

7. Method according to claim 1, further comprising mounting the light source at a position within the detector so that the light emitted from the scintillator and the light emitted from the light source couple to the light detector at mainly different places.

8. Method according to claim 7, where further comprising mounting the light source at a position that allows the light emitted from the light source to travel at least in part through the inner part of the light detector, including through the glass walls of the light detector, to a photocathode of the light detector.

9. Method according to claim 7, further comprising mounting the light source in a socket at a periphery of the detector.

10. Method according to claim 1, further comprising dynamically setting a trigger level, below which the measured pulses are deleted, during the generation of output signals on the basis of one or more of the following measured parameters:
    counting rate,
    energy spectrum of pile up signals,
    count rate of pile up signals,
    energy spectrum of noise signals, and
    count rate of noise signals.

11. Method according to claim 1, further comprising dynamically setting a pulse width range of the light source-generated light pulses, used to correct the gain shift of the light detector, during the generation of output signals on the basis of a measured temperature of the light source.

12. Method of stabilizing a detector adapted to measure ionizing radiation and produce corresponding output signals, wherein the detector comprises
    a scintillator adapted to emit light pulses when radiation is at least partly absorbed, and
    a light detector,
    a predefined light source adapted to generate light pulses having a width and/or a shape different than a width and/or a shape of the light pulses emitted by the scintillator following the absorption of radiation and
    an electronic system adapted to stabilize the detector,
    the method comprising:
        digitizing the detector output signals,
        extracting a pulse height and the pulse width for each individual detector output signal,
        separating the light source-generated light pulses from all other pulses on the basis of pulse width,
        accumulating the light source-generated light pulses for a predetermined time,
        correcting a gain shift according to a gain shift of the accumulated light source-generated light pulses, separating the scintillator-generated light pulses from all other light pulses on the basis of pulse width,
stabilizing the scintillator-generated light pulses by applying the gain shift correction of the light detector,
accumulating the scintillator-generated light pulses for a predetermined time,
determining a temperature of the detector at the time of a measurement, using the pulse width of the accumulated scintillator-generated light pulses, and
correcting the pulse heights of the detector output signals based on the detected temperature, being dependent from an average pulse width of accumulated scintillator-generated light pulses,
wherein the gain shift and temperature for a stabilization time period are determined in parallel to the generation of output signals for the immediately subsequent time period,
further comprising dynamically setting a trigger level, below which the measured pulses are deleted, during the generation of output signals on the basis of one or more of the following measured parameters:
counting rate,
energy spectrum of pile up signals,
count rate of pile up signals,
energy spectrum of noise signals, and
count rate of noise signals.

13. Method according to claim 12, wherein a predetermined period of time for accumulating the light source-generated light pulses is between 1 s and 60 s, and wherein the accumulated light source-generated light pulses are used to determine the stabilization parameters of the light detector for at least one predefined period of time, following the determination of the stabilization parameters, and wherein new light source-generated light pulses are accumulated for a predefined period of time.

14. Method according to claim 13, wherein the electronic system includes processing means, the method further comprising parallel filtering, processing and accumulation without consuming substantial additional time.

15. Method according to claim 12, wherein a predetermined period of time for accumulating the scintillator-generated light pulses is between 1 s and 60 s, and wherein the accumulated scintillator-generated light pulses are used to determine the stabilization parameters of the scintillator for at least one predefined period of time, following the determination of the stabilization parameters, and wherein new scintillator-generated light pulses are accumulated for a predefined period of time.

16. Method according to claim 15, wherein the electronic system includes processing means, the method further comprising parallel filtering, processing and accumulation without consuming substantial additional time.

17. Method according to claim 12, digitizing the detector output signals, further comprising dynamically setting a pulse width range of the scintillator-generated light pulses during the generation of output signals on the basis of measured parameters.

18. Method according to claim 17, where the set pulse width range is determined dynamically based on at least one of the following parameters:
counting rate,
temperature of the detector,
energy spectrum of pile up signals,
count rate of pile up signals,
energy spectrum of noise signals, and
count rate of noise signals.

19. Method according to claim 12, further comprising dynamically setting a pulse width range of the light source-generated light pulses, used to correct the gain shift of the light detector, during the generation of output signals on the basis of a measured temperature of the light source.

20. Method according to claim 12, further comprising mounting the light source at a position within the detector so that the light emitted from the scintillator and the light emitted from the light source couple to the light detector at mainly different places.

21. Method according to claim 20, further comprising mounting the light source at a position that allows the light emitted from the light source to travel at least in part through the inner part of the light detector, including through the glass walls of the light detector, to a photocathode of the light detector.

22. Method according to claim 20, further comprising mounting the light source in a socket at a periphery of the detector.

23. Method of stabilizing a detector adapted to measure ionizing radiation and produce corresponding output signals wherein the detector comprises
a scintillator adapted to emit light pulses when radiation is at least partly absorbed, and
a light detector,
a predefined light source adapted to generate light pulses having a width and/or a shape different than a width and/or a shape of the light pulses emitted by the scintillator following the absorption of radiation, and
an electronic system adapted to stabilize the detector,
the method comprising:
digitizing the detector output signals,
extracting a pulse height and the pulse width for each individual detector output signal,
separating the light source-generated light pulses from all other light pulses on the basis of pulse width,
accumulating the light source-generated light pulses for a redetermined time,
correcting a gain shift according to a gain shift of the accumulated light source-generated light pulses,
separating the scintillator-generated light pulses from all other light pulses on the basis of pulse width,
stabilizing the scintillator-generated light pulses by applying the gain shift correction of the light detector
accumulating the scintillator-generated light pulses for a predetermined time,
determining a temperature of the detector at the time of a measurement, using the pulse width of the accumulated scintillator-generated light pulses, and
correcting the pulse heights of the detector output signals based on the detected temperature, being dependent from an average pulse width of accumulated scintillator-generated light pulses,
wherein the gain shift and temperature for a stabilization time period are determined in parallel to the generation of output signals for the immediately subsequent time period
further comprising dynamically setting a pulse width range of the light source-generated light pulses, used to correct the gain shift of the light detector, during the generation of output signals on the basis of a measured temperature of the light source.

24. Method according to claim 23, wherein a predetermined period of time for accumulating the light source-generated light pulses is between 1 s and 60 s, and wherein the accumulated light source-generated light pulses are used to determine the stabilization parameters of the light detector for at least one predefined period of time, following the determination of the stabilization parameters, and wherein new light source-generated light pulses are accumulated for a predefined period of time.

25. Method according to claim 24, wherein the electronic system includes processing means, the method further comprising parallel filtering, processing and accumulation without consuming substantial additional time.

26. Method according to claim 23, wherein a predetermined period of time for accumulating the scintillator-generated light pulses is between 1 s and 60 s, and wherein the accumulated scintillator-generated light pulses are used to determine the stabilization parameters of the scintillator for at least one predefined period of time, following the determination of the stabilization parameters, and wherein new scintillator-generated light pulses are accumulated for a predefined period of time.

27. Method according to claim 26, wherein the electronic system includes processing means, the method further comprising parallel filtering, processing and accumulation without consuming substantial additional time.

28. Method according to claim 1, further comprising dynamically setting a pulse width range of the scintillator-generated light pulses during the generation of output signals on the basis of measured parameters.

29. Method according to claim 28, where the set pulse width range is determined dynamically based on at least one of the following parameters:
counting rate,
temperature of the detector,
energy spectrum of pile up signals,
count rate of pile up signals,
energy spectrum of noise signals, and
count rate of noise signals.

30. Method according to claim 23, further comprising dynamically setting a trigger below which the measured pulses are deleted, during the generation of output signals on the basis of one or more of the following measured parameters:
counting rate,
energy spectrum of pile up signals,
count rate of pile up signals,
energy spectrum of noise signals, and
count rate of noise signals.

31. Method according to claim 23, further comprising mounting the light source at a position within the detector so that the light emitted from the scintillator and the light emitted from the light source couple to the light detector at mainly different places.

32. Method according to claim 31, further comprising mounting the light source at a position that allows the light emitted from the light source to travel at least in part through the inner part of the light detector, including through the glass walls of the light detector, to a photocathode of the light detector.

33. Method according to claim 31, further comprising mounting the light source in a socket at a periphery of the detector.

* * * * *